United States Patent [19]

Fitzpatrick

[11] Patent Number: 4,538,189
[45] Date of Patent: Aug. 27, 1985

[54] (1,8) DATA ENCODER/DECODER

[75] Inventor: William B. Fitzpatrick, Sunnyvale, Calif.

[73] Assignee: Storage Technology Corporation, Louisville, Colo.

[21] Appl. No.: 577,510

[22] Filed: Feb. 6, 1984

[51] Int. Cl.³ .............................................. G11B 5/09
[52] U.S. Cl. ...................................................... 360/40
[58] Field of Search ............ 360/39, 40; 340/347 DD

[56] References Cited

U.S. PATENT DOCUMENTS 3,689,899 9/1972 Franaszek ........................ 340/172.5
4,115,768 9/1978 Eggenberger et al. ............. 340/347

Primary Examiner—Vincent P. Canney
Attorney, Agent, or Firm—Woodcock, Washburn, Kurtz, Mackiewicz & Norris

[57] ABSTRACT

The present invention comprises circuitry for encoding and decoding data according to a (1,8) run-length-limited, variable-length code word scheme. The encoder comprises three four-stage shift registers, two groups of logic gates and a final set of flip flops for clocking the encoding data at twice the incoming data frequency. One set of logic gates uses the outputs of each shift register to produce the encoded data, which is then reclocked at the data frequency. The other set of logic gates uses the outputs of all three sets of shift registers to locate the word boundaries, and supplies this information as input to the third shift register. The decoder consists of a twelve-stage shift register, two sets of logic gates, three single flip flops and a two-to-one multiplexer. One set of logic gates provides decoding for the odd-numbered encoded bits and the other set decodes the even numbered bits. The outputs are then reclocked by a flip flop at half the decoded data rate, and are multiplexed and reclocked at the decoded data rate. Clock circuitry for generating various clocking signals required in the operation of the encoder circuit is also shown.

6 Claims, 5 Drawing Figures

(1,8) DATA ENCODER/DECODER

FIELD OF THE INVENTION

This invention relates to circuitry for encoding and decoding digital data in connection with its storage on magnetic storage media, typically disk or tape drives. More particularly, the invention relates to circuitry for encoding and decoding data according to the so called (1,8) run-length-limited, variable-length code word encoding techniques.

BACKGROUND OF THE INVENTION

Run-length-limited variable-length code word data encoding and decoding techniques are well known in the art and are fully discussed in U.S. Pat. No. 3,689,899 to Franaszek, which also includes a full discussion of the advantages of these techniques. Speaking broadly, use of run-length-limited, variable-length code word encoding schemes allows data to be encoded in such a way that it can be recorded at relatively high density on magnetic storage media such as magnetic disks or tape, and also allows the detection of errors in decoding thereof such that only words erroneously decoded are lost. Certain prior techniques did not permit recovery from errors, such that errors could propagate indefinitely. The use of a variable-length code word encoding scheme also allows some substantial simplification of circuitry and higher speed of operation than did fixed-length encoding schemes. For these reasons, run-length-limited, variable-length code word encoding schemes, such as proposed in the Franaszek patent, have become near universal in the art.

According to the run-length-limited, variable-length encoding schemes proposed in the Franaszek patent, the codes proposed can be referred to generally as (d,k) codes, where d is the minimum number of "zeroes" between any two adjacent "ones" in an encoded data pattern, and k is the maximum number of zeroes between any two adjacent "ones". A minimum number of zeroes is required so that the adjacent ones are always separated on the media by some minimum distance required to avoid distortion and the maximum number is required so that the ones are never separated by more than a given distance, so that self-clocking of the data is still possible. It will be understood by those skilled in the art that according to modern recording techniques only the ones are actually recorded on the media; self-clocking is used upon decoding to insert the correct number of zeroes between adjacent ones in the decoded data stream.

Use of such run-length-limited (d,k) codes, in which $d=2$ and $k=7$, are nearly universal in the data processing art today, and numerous patents show circuitry for achieving (2,7) encoding and decoding. Eggenburger U.S. Pat. No. 4,115,768 shows a typical approach, while co-pending U.S. patent application Ser. No. 444,158, filed Nov. 24, 1982 on behalf of the present inventor shows an improvement on the circuitry shown in the Eggenburger patent.

The Franaszek patent also discusses a code in which d and k are equal to 1 and 8 respectively, that is in which adjacent "ones" in an encoded data stream are separated by no less than one nor no more than eight "zeroes." However, the circuitry proposed by the Franaszek patent is in block diagram form only, particularly as regards the decoder; as far as the present inventor knows, no circuit has been fully designed which implements the (1,8) code proposed by Franaszek. Moreover, as far as the present inventor is aware no commercial system has been built which uses this code.

Use of the (1,8) code has several advantages over the (2,7) code, chiefly higher data rate. For instance, a code word of 6 bits written on a disk represents 4 data bits in the (1,8) scheme but only 3 bits in a (2,7) scheme. Assuming the number of encoded bits per inch remains the same, the (1,8) code therefore allows an increase of 33% in the effective data density. In the highly competitive data processing market, a 33% improvement is very substantial. It should be recognized, and will be by those skilled in the art, however, that the condition that the number of encoded bits written per inch remains the same is not trivial because according to the (1,8) code, d, the minimum distance between adjacent ones, is only half that of the (2,7) code. According to the 2,7 codes, the closest flux transitions are thus separated by two zeroes: 100100 . . . , while in the 1,8 code, the 101010 . . . pattern can appear. Accordingly, for a given minimum spacing between flux changes, for a given head/media combination, the net uncoded bit density remains the same. Closeness of adjacent transitions (representing ones) is a limiting factor in disk drive performance. Nevertheless, improvements in technology are being made continually, and it seems highly likely that soon the (1,8) code will be highly desirable if not commercially requisite.

Even if such improvements in the maximum flux change density permissible with a given head/disk combination are not forthcoming, the 1,8 code has an advantage over the 2,7 code in the area of the "detect window". That is, data encoded by 1,8 rules is somewhat easier to read from the disk. Accordingly, there is a need in the art for a high speed circuit for encoding and decoding magnetic data according to the (1,8) run-length-limited variable-length coding rules shown in the Franaszek patent. Such a circuit to be successful would have to be capable of reliably encoding and decoding data at very high rates up to on the order of 40 MHz. Furthermore, such circuits would desirably not be prohibitively complex, nor expensive to manufacture.

OBJECTS OF THE INVENTION

Accordingly, it is the object of the invention to provide circuits for encoding and decoding digital data according to the (1,8) run-length-limited, variable length coding scheme proposed in Franaszek U.S. Pat. No. 3,689,899.

It is a further object of the invention to provide circuits for encoding and decoding data according to the (1,8) run-length-limited, variable-length code word encoding scheme which are readily manufacturable at reasonable cost, yet which is reliable in practice and capable of operating at very high data rates.

SUMMARY OF THE INVENTION

The present invention comprises circuitry for encoding and decoding data according to the (1,8) run-length-limited, variable-length code word scheme proposed in the Franaszek patent referred to above. The encoder comprises three four-stage shift registers, two groups of logic gates and a final set of flip flops for clocking the encoded data at 3/2 the incoming data frequency. One set of logic gates uses the outputs of each shift register to produce the encoded data, which is then reclocked at 3/2 the data frequency. The other set of logic gates uses the outputs of all three sets of shift registers to locate the code word boundaries, and supplies this information as input to the third shift register. The decoder consists of a twelve stage shift register, two sets of logic gates, three single flip flops and a two-to-one multiplexer. One set of logic gates provides decoding for odd numbered bits and the other set decodes the even numbered bits. The outputs are then reclocked by a flip flop at half the decoded data rate, and are multiplexed and reclocked at the decoded data rate.

BRIEF DESCRIPTION OF THE DRAWINGS

The invention will be better understood if reference is made to the accompanying drawings, in which.

DESCRIPTION OF THE PREFERRED EMBODIMENT

As discussed above, the present invention relates to circuitry for encoding and decoding magnetic data wherein ordinary data, i.e. ones and zeroes, is encoded according to the (1,8) run-length-limited, variable-length code word scheme proposed in U.S. Pat. No. 3,689,899 to Franaszek. The (1,8) coding proposed by Franaszek is shown in Table I below.

TABLE I

| ENCODED WORDS | ORIGINAL OR DECODED WORDS |
| --- | --- |
| 010 | 00 |
| 100 | 11 |
| 101000 | 1000 |
| 101010 | 1001 |
| 001010 | 1010 |
| 001000 | 1011 |
| 000100 | 0100 |
| 000010 | 0110 |
| 000001010 | 011100 |
| 000001000 | 011101 |
| 000101010 | 011110 |
| 000101000 | 011111 |
| 001001010 | 010100 |
| 001001000 | 010101 |
| 101001010 | 010110 |
| 101001000 | 010111 |

According to the present invention, the code shown in the Franaszek patent is slightly modified for convenience of logic design. The code words used are the same but correspond to different original decoded words. The actual code conversion table used in the present invention is shown in Table II below.

TABLE II

| ENCODED WORDS | ORIGINAL OR DECODED WORDS |
| --- | --- |
| 010 | 11 |
| 100 | 00 |
| 101000 | 1010 |
| 101010 | 1011 |
| 001010 | 1001 |
| 001000 | 1000 |
| 000100 | 0100 |
| 000010 | 0110 |

TABLE II-continued

| ENCODED WORDS | ORIGINAL OR DECODED WORDS |
| --- | --- |
| 000001010 | 010101 |
| 000001000 | 010100 |
| 000101010 | 010111 |
| 000101000 | 010110 |
| 001001010 | 011101 |
| 001001000 | 011100 |
| 101001010 | 011111 |
| 101001000 | 011110 |

It will be observed by those skilled in the art that there is a 2:3 relationship between the original and encoded word lengths; that is, two bits of the original data are encoded as three, four as six and six as nine. This provides an improvement over the (2,7) encoding scheme in which two bits are encoded as four, three as six and four as eight. Accordingly, it is apparent that if the bit density can be kept constant with the closer minimum spacing of flux changes or transitions on the media representing ones in the (1,8) encoding scheme, an advantage will be realized.

Figure 1:
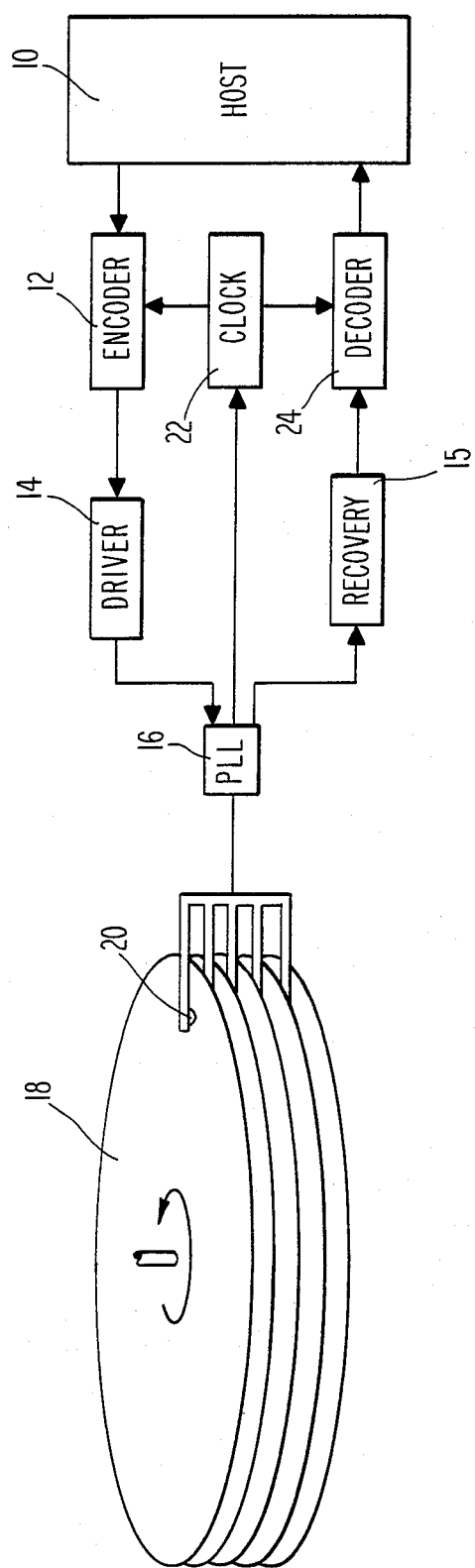
FIG. 1 represents a schematic view of a disk drive according to the invention.

FIG. 1 shows a schematic view of a disk drive using the circuitry according to the invention. In the write mode, data supplied from a host computer 10 is encoded by encoder circuitry 12 detailed in FIG. 2. The encoded data is passed to driver circuitry 14, is clocked by a phase-locked-loop circuit 16 and is written to a conventional magnetic disk 18 by a read/write head 20. When reading, data read by the read/write head 20 is input to the phase-locked loop 16, which supplies a clock signal to a clock 22, which is detailed in FIG. 4, is recovered at 15, i.e., additional zeroes are inserted between the ones which are actually recorded on the disk, and is decoded in decoder circuitry 24 detailed in FIG. 3, and is supplied to the host 10. The drive of FIG. 1 is conventional and what is shown there forms no part of the present invention except insofar as the present invention relates to improvements in the circuits of encoder 12, decoder 24 and clock 22.

As is well understood, and as mentioned briefly above, according to conventional modified frequency modulation recording techniques, only the "ones" of an encoded bit stream are actually written to and read from a magnetic disk as magnetic flux transitions. This allows reduction of the number of bits which are written, as compared with an encoding scheme in which both ones and zeroes are written. The minimum spacing of these transitions which permits decoding is then the limit of performance of a disk drive. (The same principles apply, of course, in tape drives.) Coding of the data, effectively reducing the number of ones which must be written to a disk in order to store a given data pattern, is thus clearly desirable. As discussed above, the Franaszek U.S. Pat. No. 3,689,899 shows an effective coding scheme.

Figure 2:
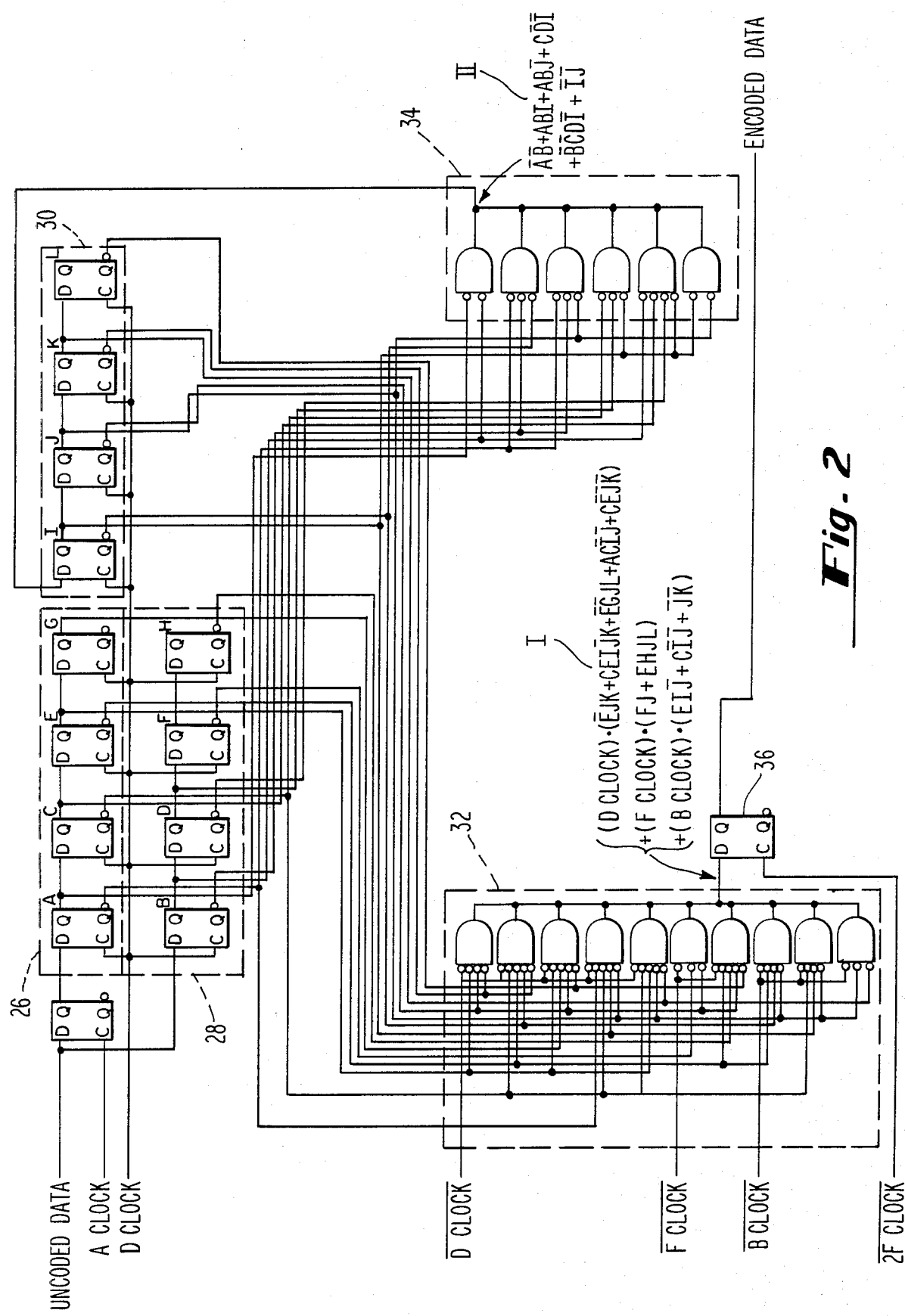
FIG. 2 shows the (1,8) encoder circuitry according to the invention.

FIG. 2 shows circuitry for converting an incoming data stream, e.g. the original words of Table II, to the encoded words also shown in Table II. The circuitry shown in FIG. 2 consists of three four-stage shift registers, 26, 28, and 30 configured as four groups of conventional D-type flip-flops, two groups of logic circuitry 32 and 34 and a final flip flop 36 for reclocking the data at the coded data frequency, which is referred to hereinafter as the "2F" frequency. The first shift register 26 stores the odd numbered bits of the uncoded data, i.e., the first, third, fifth, and seventh bits of an eight-bit word, in serial fashion; the outputs of these four flip-flops are referred to herein and on the drawing of FIG. 2 as A, C, E, and G respectively. In a similar fashion, the second four stage shift register stores the even numbered uncoded bits, referred to as B, D, F and H respectively. The third four stage shift register 30 stores information about the location of the word boundaries. Since the uncoded words are an even number of bits in length, i.e. are 2, 4, or 6 bits long, the uncoded data is clocked into the shift registers in a pair wise fashion at half the uncoded data frequency ($\frac{2}{3}$ F). It is for the same reason that the shift register 30 storing the word boundary information is clocked at the same $\frac{2}{3}$ F frequency. The outputs of the four stages of the third shift register 30 are I, J, K, and L respectively. The first set of logic gates 32 uses the outputs of the shift registers to produce the encoded data, which is represented by the signal I in FIG. 2. This is logically equivalent to the Boolean statement:

$$I = (D\ clock).(\overline{EJK} + \overline{CEIJK} + \overline{EGJL} + AC\overline{IJ} + \overline{CEJK})$$
$$+ (F\ clock).(\overline{FJ} + \overline{EHJL})$$
$$+ (B\ clock).(E\overline{IJ} + C\overline{IJ} + \overline{JK}),$$

The clock signals mentioned are generated by the circuit shown in FIG. 4; in the above expression, as is conventional, "+" indicates Boolean "OR" and "." indicates "AND."

The other set of logic gates 34 uses the outputs of all three shift registers 26, 28 and 30 to determine if a word boundary exists and supplies this information to the input of the third shift register 30. The signal supplied, II, is equivalent to the Boolean identity:

$$II = \overline{AB} + ABI + AB\overline{J} + C\overline{DI} + \overline{BCDI} + IJ$$

Figure 3:
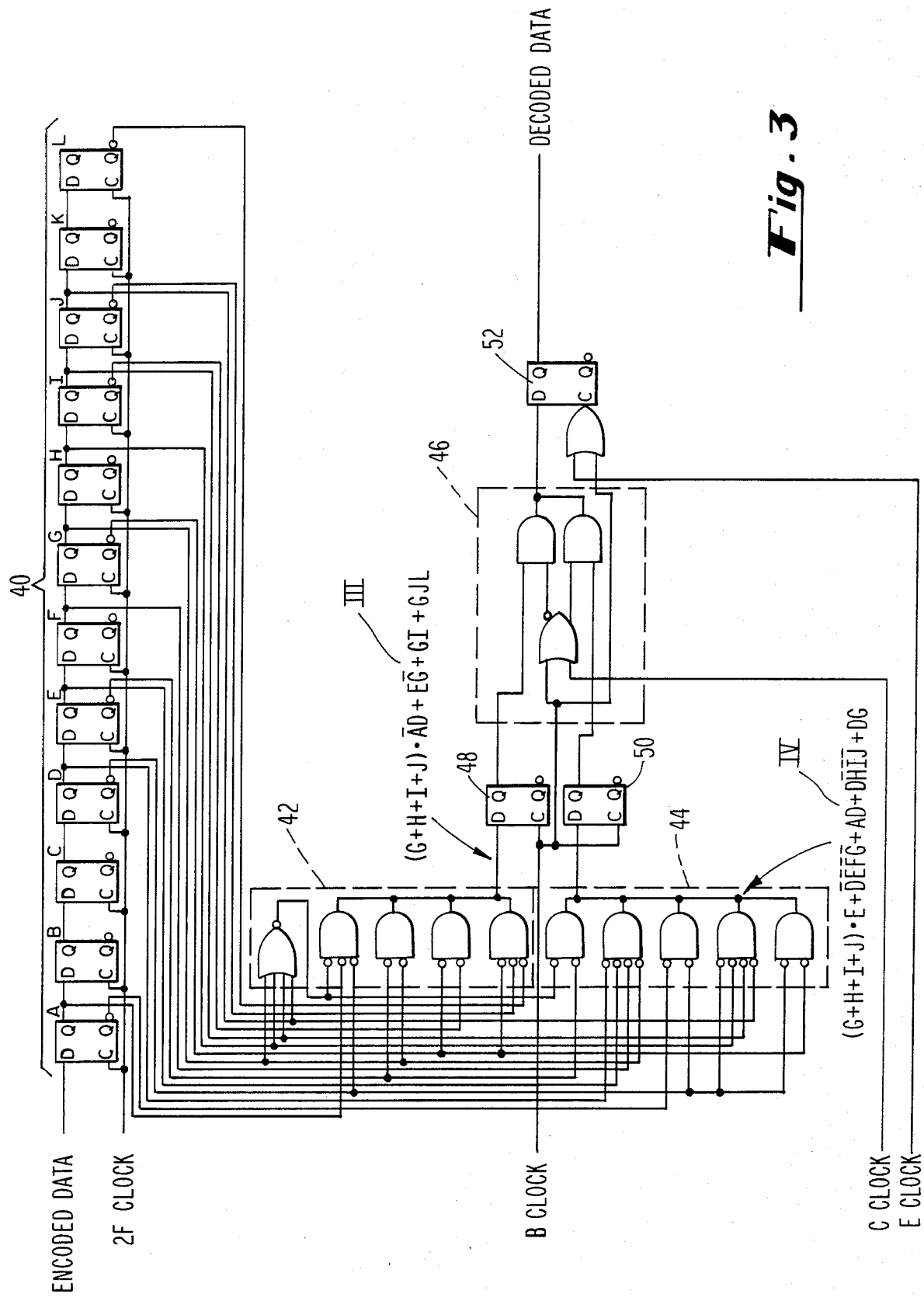
FIG. 3 shows the (1,8) decoder circuitry according to the invention.
Figure 4:
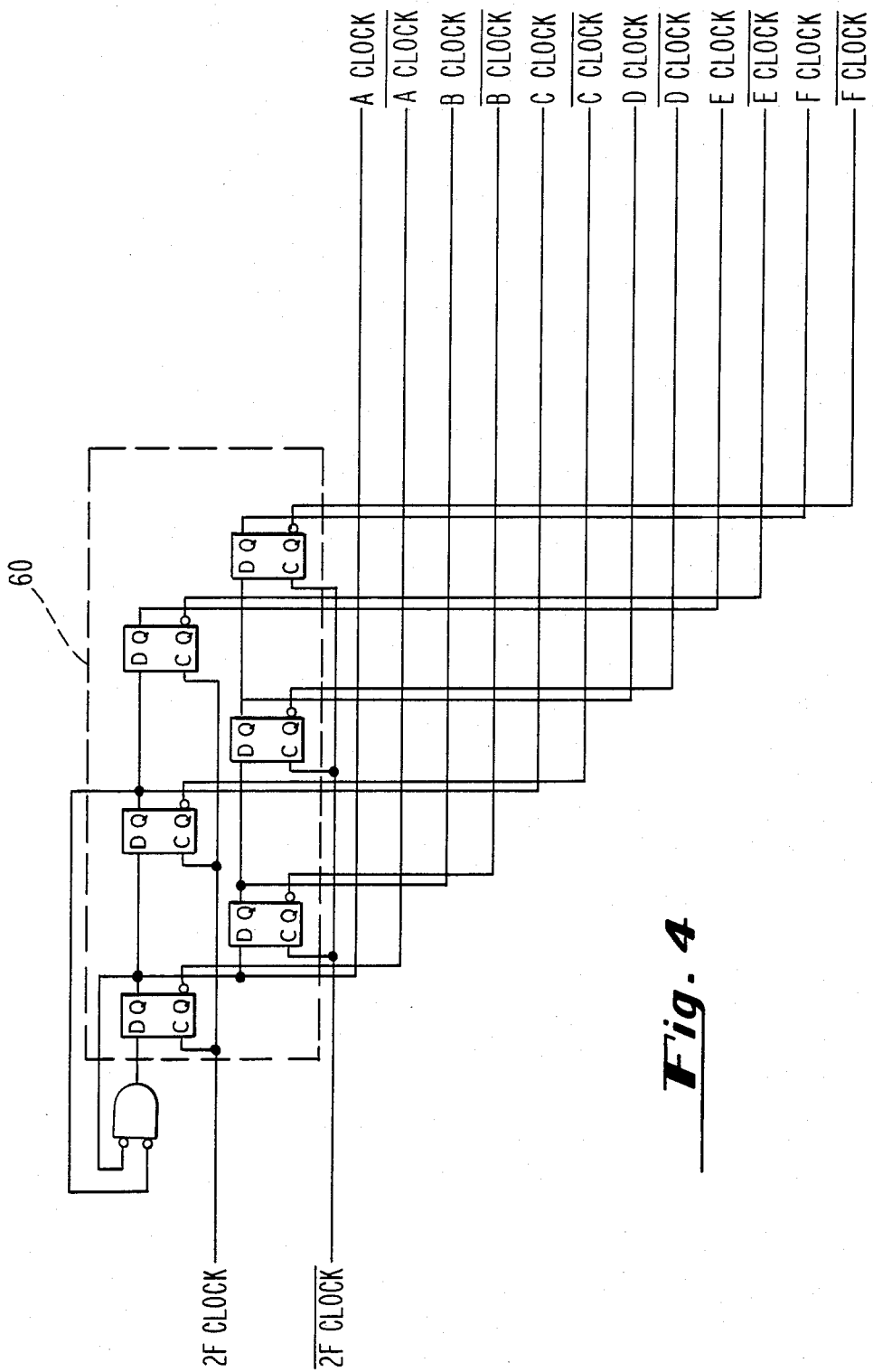
FIG. 4 shows clock signal generation circuitry.

FIG. 3 shows the decoder circuitry according to the invention. It comprises a 12-stage shift register 40, typically comprising 12 serially connected D-type flip-flops, first and second sets of logic gates 42 and 44, three single flip-flops 48, 50 and 52 and a two-to-one multiplexer 46. Encoded data is clocked into the 12-stage shift register 40 in serial fashion at the 2F frequency. The outputs of each of the 12 stages, referred to as A,B,C . . . L, respectively, are decoded by the two sets of logic gates 42 and 44, connected as shown. The first set 42 decodes the odd numbered coded bits, and outputs a signal shown at III on FIG. 3, equivalent to the Boolean identity:

$$III = (G + H + I + J).\ \overline{AD} + E\overline{G} + GI + GJL.$$

The second set of logic gates 44 decodes the even numbered coded bits, providing an output shown as IV and equivalent to the Boolean identity $$IV = (G + H + I + J).\ E + \overline{DEFG} + AD + D\overline{HIJ} + DG.$$

The outputs of the sets of logic gates 42 and 44 are reclocked by flip flops 48 and 50 respectively at half the decoded data rate ($\frac{2}{3}$ F). The outputs of these two flip-flops 48 and 50 represent the odd and even numbered bits of each decoded bit pair. The two bits of each pair are then multiplexed by logic gates 46, and then are reclocked at the data rate in flip-flop 52. Again the several clock signals shown in FIG. 3 are generated by clock circuitry shown in FIG. 4.

FIG. 4, as mentioned, shows the circuitry generating the clocking signals required. The coded data frequency "2F CLOCK" and its inverse are supplied to the 6 D-type flip-flops 60 shown making up the clock generation circuitry. The 2F clock signal is derived from the phase-locked-loop circuit 16 (FIG. 1), thus ensuring that it is accurately synchronized with the data rate of the data encoded on the disk.

Figure 5:
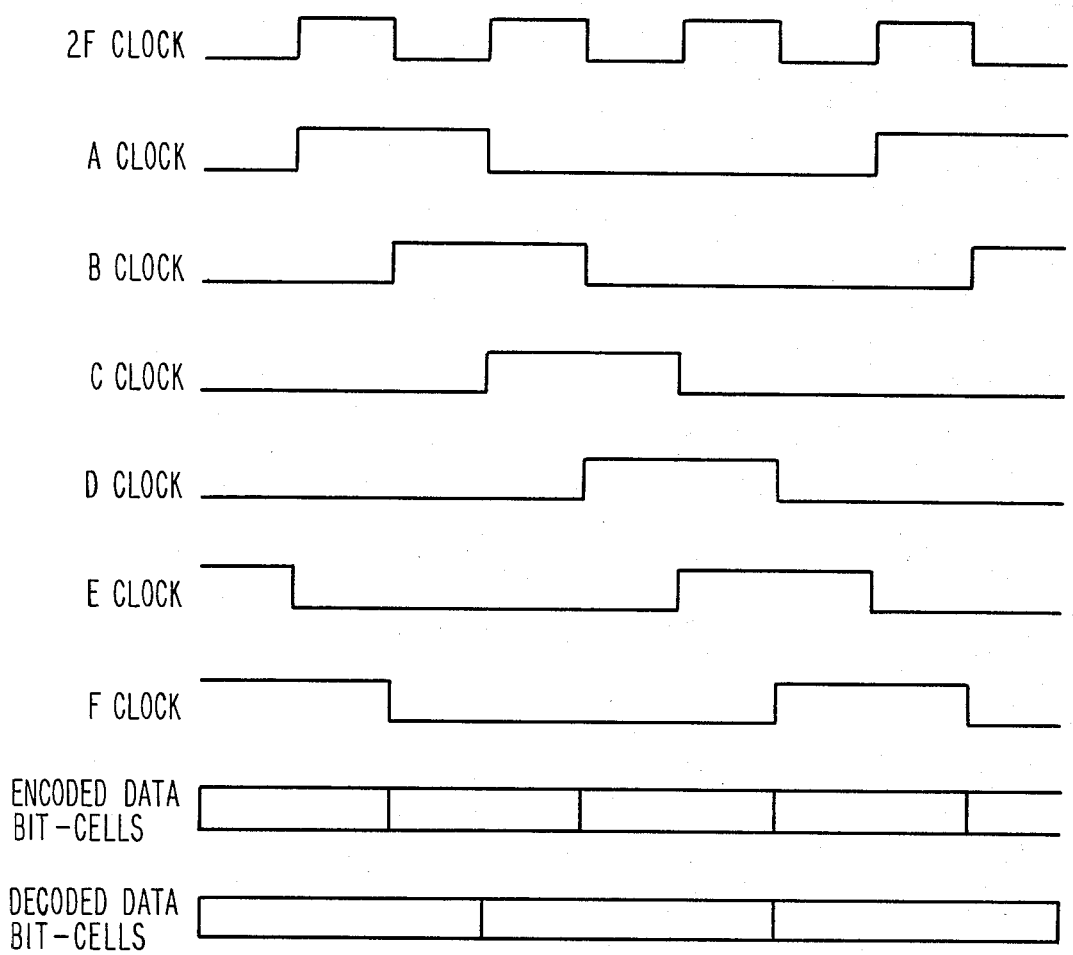
FIG. 5 shows a timing diagram of the clock signals output by the circuitry of FIG. 4.

FIG. 5 is a timing diagram detailing the relationship between the several clock signals referred to in FIGS. 2 and 3 and which are output by the circuitry of FIG. 4. FIG. 5 also shows the relationship of the encoded data bit cells to the decoded data bit cells, which as shown are in a 3:2 relationship. It will be observed from FIG. 5 that the clock signals A, B, C, D, E and F are respectively each displaced from one another by one-half of the period of the 2F CLOCK signal, that is, by one-fourth the encoded data period, and are high for half the data period; thus, for example, D CLOCK goes high when B CLOCK goes low, and F CLOCK goes high when D CLOCK goes low.

Those skilled in the art will have no difficulty implementing the circuits described above and shown in the Figures hereof which provide (1,8) run-length-limited data encoding and decoding circuitry according to the invention. The best mode of practice of the invention is believed to be implementation of the entire circuit on a single integrated circuit chip; this has been achieved, for example, using a so-called Motorola Macrocell Array chip. The circuitry shown in FIGS. 2 and 3 can be combined with circuitry shown in applicant's co-pending application Ser. No. 444,158, incorporated herein by reference, which relates to comparable circuitry for encoding and decoding data according to the 2,7 run-length-limited coding rules. A chip incorporating both sets of circuitry is a particularly preferred embodiment of the circuit of the present invention, because such a custom chip provides substantial economy in manufacturing for use in disk drives of varying capability.

It will be appreciated while there have been described a preferred embodiment and a best mode of practice of the invention, other modifications and variations thereon are within the skill of the art, and accordingly, that the above specification should not be construed as a limitation on the scope of the present invention but only as exemplary thereof. The invention is limited only by the following claims.

We claim:

1. A disk drive for storing data received from a host computer comprising:
    magnetic disk storage media;
    read/write head means for writing data to said disk and reading data from said disk;
    data encoding circuitry for encoding data received from the host computer according to (1,8) run-length-limited, variable length code word encoding techniques; and
    data decoding circuitry for decoding (1,8) encoded data read from said disk into a stream of data suitable for outputting to said host;
    wherein said encoding circuitry comprises first, second and third shift registers, each comprising four stages, each of those stages outputting a signal;
    the signals output by the stages of said first shift register being denominated A, C, E and G, respectively;
    the signals output by the stages of the second shift register being denominated B, D, F, and H respectively;

the signals output by the stages of the third shift register being denominated I, J, K and L, respectively;

clock means for outputting D clock, F clock, and B clock signals; and first and second group of logic circuitry, said first group of logic circuitry outputting a signal equivalent to the Boolean logic statement I, where $$I = (D\ clock). (\overline{EJK} + CEI\overline{JK} + \overline{EGJL} + AC\overline{IJ} + \overline{CEJK}) + (F\ clock). (FJ + EHJL) + (B\ clock). (EI\overline{J} + C\overline{IJ} + \overline{JK}),$$

as the encoded data signal, and the second group of logic circuitry outputting a signal equivalent to the Boolean logic statement II, where $$II = \overline{AB} + ABI + AB\overline{J} + C\overline{DI} + \overline{BCDI} + \overline{IJ},$$

supplied to said third shift register.

2. The disk drive of claim 1 wherein said decoder circuitry comprises a 12-stage shift register, the stages of said shift register outputting signals denominated as A, B, C, D, E, F, G, H, I, J, K, and L respectively; and first and second groups of logic circuitry wherein said first group of logic circuitry outputs a signal equivalent to the Boolean logic statement III, where $$III = (G + H + I + J). \overline{AD} + E\overline{G} + GI + GJL,$$

the second group of logic circuitry outputs a signal equivalent to the Boolean logic statement IV, where $$IV = (G + H + I + J). E + \overline{DEFG} + AD + D\overline{HIJ} + DG;$$

wherein said signals III and IV output by said first and second groups of logic circuitry are multiplexed to provide a decoded data signal.

3. A disk drive for storing data received from a host computer comprising:

magnetic disk storage media;

read/write head means for writing data to said disk and reading data from said disk;

data encoding circuitry for encoding data received from host computer according to (1,8) run-length-limited, variable-length code word encoding techniques; and data decoding circuitry for decoding such (1,8) encoded data read from said disk into a stream of data suitable for outputting to said host;

wherein said data decoding circuitry comprises a 12-stage shift register, the stages of said shift register outputting signals denominated as A, B, C, D, E, F, G, H, I, J, K, and L respectively; and first and second groups of logic circuitry wherein said first group of logic circuitry outputs a signal equivalent to the Boolean logic statement III, where $$III = (G + H + I + J). \overline{AD} + E\overline{G} + GI + GJL,$$

and the second group of logic circuitry outputs a signal equivalent to the Boolean logic statement IV, where $$IV = (G + H + I + J). E + \overline{DEFG} + AD + D\overline{HIJ} + DG;$$

wherein said signals III and IV output by said first and second groups of logic circuitry are multiplexed to provide a decoded data signal.

4. The disk drive of claim 3 wherein said encoding circuitry comprises first, second and third shift registers, each comprising four stages, each of those stages outputting a signal;

the signals output by the stages of said first shift register being denominated A, C, E and G,;

the signals output by the four stages of the second shift register being denominated B, D, F, and H respectively;

the signals output by the stages of the third shift register being denominated I, J, K and L, respectively;

clock means for outputting D CLOCK, F CLOCK, and B CLOCK signals; and first and second group of logic circuitry, said first group of logic circuitry outputting a signal equivalent to Boolean I, where $$I = (D\ clock). (\overline{EJK} + CEI\overline{JK} + \overline{EGJL} + AC\overline{IJ} + \overline{CEJK}) + (F\ clock). (FJ + EHJL) + (B\ clock). (EI\overline{J} + C\overline{IJ} + \overline{JK}),$$

as the encoded data signal, and the second group of logic circuitry outputting a signal equivalent to the Boolean logic statement II, where $$II = \overline{AB} + ABI + AB\overline{J} + C\overline{DI} + \overline{BCDI} + \overline{IJ},\text{ supplied to}$$

said third shift register.

5. (1,8) run-length-limited encoder circuitry comprising:

first, second and third shift registers, each shift register comprising four stages, the signals output by said first shift register being dominated A, C, E, and G respectively; the signals output by the four stages of the second shift register being denominated B, D, F, and H respectively, and the signals output by the four stages of the third shift register being denominated I, J, K and L respectively;

clock means for supplying D clock, F clock, and B clock signals; and first and second groups of logic circuitry, said first group of logic circuitry outputting a signal equivalent to Boolean statement I, where $$I = (D\ clock). (\overline{EJK} + CEI\overline{JK} + \overline{EGJL} + AC\overline{IJ} + \overline{CEJK}) + (F\ clock). (FJ + EHJL) + (B\ clock). (EI\overline{J} + C\overline{IJ} + \overline{JK}),$$

as the encoded data signal, and the second group of logic circuitry outputting a signal equivalent to the Boolean logic statement II, where $$II = \overline{AB} + ABI + AB\overline{J} + C\overline{DI} + \overline{BCDI} + \overline{IJ},$$

indicative of word boundaries.

6. A circuit for decoding (1,8) run-length-limited encoded data, comprising:

a 12-stage shift register, the stages of said shift register outputting signals denominated as A, B, C, D, E, F, G, H, I, J, K, and L respectively;

first and second groups of logic circuitry wherein said first group of logic circuitry outputs a signal equivalent to the Boolean statement III, where $$III = (G + H + I + J). \overline{AD} + E\overline{G} + GI + GJL;\text{ and}$$

the second group of logic circuitry outputs a signal equivalent to the Boolean statement IV, where $$IV = (G + H + I + J). E + \overline{DEFG} + AD + D\overline{HIJ} + DG;\text{ and}$$

means for multiplexing the signals output by said first and second groups of logic circuitry to provide a decoded data signal.

* * * * *